(12) United States Patent
Lu (10) Patent No.: US 8,439,191 B1
(45) Date of Patent: May 14, 2013

(54) CELL PHONE PROTECTOR CASE HAVING THE COMBINATION OF AN INTERIOR SOFT SILICONE SHELL AND A HARD EXTERIOR SHELL WITH ALIGNED RETAINING MEMBERS

(71) Applicant: Min Lu, Shenzhen (CN)

(72) Inventor: Min Lu, Shenzhen (CN)

(73) Assignee: Valor Communication, Inc., City of Industry, CA (US)

( * ) Notice: Subject to any disclaimer, the term of this patent is extended or adjusted under 35 U.S.C. 154(b) by 0 days.

(21) Appl. No.: 13/656,221

(22) Filed: Oct. 19, 2012

(51) Int. Cl.
*B65D 85/00* (2006.01)
(52) U.S. Cl.
USPC .................................... 206/320; 455/575.8
(58) Field of Classification Search .............. 206/38, 206/305, 320, 701; 361/679.01; 455/90.3, 455/575.1, 575.8
See application file for complete search history.

(56) References Cited

U.S. PATENT DOCUMENTS

| | | | |
|---|---|---|---|
| 6,995,976 B2 * | 2/2006 | Richardson .................. | 206/320 |
| 7,230,823 B2 * | 6/2007 | Richardson et al. ........ | 455/575.8 |
| 7,594,576 B2 * | 9/2009 | Chen et al. ................... | 206/320 |
| D606,305 S | 12/2009 | Lee et al. | |
| D610,807 S | 3/2010 | Bau | |
| 7,933,122 B2 * | 4/2011 | Richardson et al. ......... | 206/320 |
| D646,673 S | 10/2011 | Fathollahi | |
| 8,051,980 B2 * | 11/2011 | Tai et al. ..................... | 206/320 |
| 8,204,561 B2 | 6/2012 | Mongan et al. | |
| 8,245,842 B2 * | 8/2012 | Bau ............................. | 206/320 |
| 2004/0089570 A1 * | 5/2004 | Chien et al. .................. | 206/320 |
| 2008/0053852 A1 * | 3/2008 | Ko et al. ...................... | 206/320 |
| 2009/0032422 A1 * | 2/2009 | Roeser ......................... | 206/320 |
| 2010/0096284 A1 | 4/2010 | Bau | |
| 2010/0104814 A1 | 4/2010 | Richardson et al. | |
| 2010/0203931 A1 | 8/2010 | Hynecek et al. | |
| 2012/0071217 A1 | 3/2012 | Park | |

FOREIGN PATENT DOCUMENTS

CN  201499752  6/2010
CN  202261424  5/2012

* cited by examiner

*Primary Examiner* — Luan K Bui
(74) *Attorney, Agent, or Firm* — Thomas I. Rozsa (57) ABSTRACT

A cell phone protector case comprising a combination of an interior soft silicone shell and a first and second hard shell press fit retained on opposite surfaces and sides of the interior soft silicone shell with the hard shell having matching retaining closing member mating flanges.

11 Claims, 8 Drawing Sheets

CELL PHONE PROTECTOR CASE HAVING THE COMBINATION OF AN INTERIOR SOFT SILICONE SHELL AND A HARD EXTERIOR SHELL WITH ALIGNED RETAINING MEMBERS

BACKGROUND OF THE INVENTION

1. Field of the Invention

The present invention relates to the field of cell phone protector cases and in particular, cell phone protector cases which are designed to facilitate utilization of the cell phone while at the same time providing a protective covering to the cell phone so that the cell phone is not damaged if it is inadvertently bumped or dropped.

2. Description of the Prior Art

There are numerous designs for various cell phone protector cases that are known in the prior art. The following 12 patents and published patent applications are the closest relevant prior art:

1. U.S. Pat. No. 7,230,823 issued to Curtis R. Richardson et al. on Jun. 12, 2007 for "Protective Membrane For Touch Screen Device" (hereafter the "'823 Richardson Patent");
2. U.S. Design Pat. No. D606,305 issued to Edmund S. Lee et al. on Dec. 22, 2009 for "Mobile Media Device Enclosure" (hereafter the "Lee Design Patent");
3. U.S. Design Pat. No. D610,807 issued to Steven Chi Vun Bau on Mar. 2, 2010 for "Protective Case For Portable Handheld Electronic Device" (hereafter the "Bau Design Patent");
4. United States Published Patent Application No. 2010/0096284 to Steven Chi Vun Bau on Apr. 22, 2010 for "Protective Case Having A Hybrid Structure For Portable Handheld Electronic Devices" (hereafter the "Bau Published Patent Application");
5. United States Published Patent Application No. 2010/0104814 to Curtis R. Richardson et al. on Apr. 29, 2010 for "Protective Cushion Cover For An Electronic Device" (hereafter the "Richardson Published Patent Application");
6. United States Published Patent Application No. 2010/0203931 to Bryan Lee Hynecek et al. on Aug. 12, 2010 for "One Piece Co-Formed Exterior Hard Shell Case With An Elastomeric Liner For Mobile Electric Devices" (hereafter the "Hynecek Published Patent Application");
7. U.S. Pat. No. 7,933,122 issued to Curtis R. Richardson et al. on Apr. 26, 2011 for "Protective Enclosure For A Computer" (hereafter the "'122 Richardson Patent");
8. U.S. Design Pat. No. D646,673 issued to Andy Fathollahi on Oct. 11, 2011 for "Case" (hereafter the "Fathollahi Design Patent");
9. United States Published Patent Application No. 2012/0071217 to Han Jong Park on Mar. 22, 2012 for "Protector for Smartphone" (hereafter the "Park Published Patent Application");
10. U.S. Pat. No. 8,204,561 issued to Ryan Hill Mongan et al. on Jun. 19, 2012 for "One Piece Co-Formed Exterior Hard Shell Case With An Elastomeric Liner For Mobile Electronic Devices" (hereafter the "Mongan Patent");
11. Chinese Patent No. CN201499752 issued to Mudan Yao on Jun. 9, 2010 for "Mobile Phone Protection Sleeve" (hereafter the "Yao Chinese Patent");
12. Chinese Patent No. CN202261424 issued to Tian Hui Zhu on May 30, 2012 for "An Anti-Falling Anti-Slip Hand Casing" (hereafter the "Zhu Chinese Patent").

The '823 Richardson Patent discloses a protector case having a protective membrane for touch screen device. The patent discloses:

"A protective membrane is disclosed for an electronic device that has a touch screen. The touch screen is protected with a membrane adapted to the specific contour and profile of the electronic device and allows the user to use the touch screen interface with no shortcomings. The protective case is further adapted to allow infrared and other communication signals while the device is secured inside the case. Further, electrical connections can be made through the case without affecting the protection afforded the electronic device inside."

The most relevant portion of the patent appears in Column 11 beginning on Line 33 wherein the patent states:

"FIG. 12 illustrates an embodiment 1200 of the present invention of a protective cover for a PDA or other device. A rigid front cover 1202 and a rigid rear cover 1204 are held together with a series of latches 1206, 1208, 1210, and 1212. The protective membrane 1214 protects the touchscreen of the enclosed PDA. A folding rigid cover 1216 operates as a rigid shield to prevent the membrane 1214 from any damage. The stylus holder 1220 is formed from an overmolded flexible material in which the membrane 1214 is mounted.

Embodiment 1200 illustrates yet another embodiment of the present invention wherein a rigid protective cover may be used to contain and protect an electronic device, but provide full usable access to a touchscreen. The protective membrane 1214 and case may be watertight in some embodiments."

The Lee Design Patent discloses a design for a cell phone protector case which appears to have a hard outer shell and a softer inner member.

The Bau Design Patent appears to be a one-piece cell phone protector case with a shell on the back which wraps around the interior where the cell phone is retained.

The Bau Published Patent Application was published in 2010 and has since issued as a U.S. Pat. No. 8,245,842 on Aug. 21, 2012. It discloses a protective case having a hybrid structure for portable handheld electronic devices. The relevant portion as set forth in the abstract is that the protective case includes:

"a "glove" or "skin" piece of softer material that substantially covers and grips the entire back of the electronic device by wrapping over the edge of the electronic device (without obscuring the display/touch screen on the front of the device). One or more separate complementary frame pieces, braces and the like made of a hard material are attached over the glove piece, extending over a substantial area of the glove piece, thereby creating a robust interlocking hybrid structure." The hard exterior shell is comprised of fingers extending over the back of the case.

The Richardson Published Patent Application discloses:

"A protective cover for an electronic device that is made from an elastomeric material that simultaneously provides cushioning that would otherwise be provided by a softer, thicker material, while utilizing a single, denser material that provides a slim profile and has sufficient density to conform well to the electronic device and prevent the transmission of impacts with hard surfaces directly to the electronic device. Although a denser material is used for the protective cover, recesses are formed in thicker portions at impact points that create compressible ribs. The ribs provide softer, cushioned portions of the cover in the impact areas, which are capable of absorbing the shock and energy of impacts. Other protective covers have a uniform thickness."

This device has the interior soft silicone membrane with just a single backing rather than the backing on either side of the cell phone protector case.

The Hynecek Published Patent Application discloses:

"A one-piece co-formed exterior hard shell case with an elastomeric liner formed on the interior of the exterior hard shell for mobile electronic devices. This hard protective exterior shell allows the device maximum protection from impacts with sharp objects while the interior elastomeric portion that provides shock protection for the device from impacts. The exterior hard shell part is formed to fit the device closely with a small offset from the devices surface. The exterior hard shell raps around the edges of the device. To allow the shell to be able to be mounted on the device the corners of the hard shell are cut open. This allows each sidewall to flex away when a device is inserted and snap back once it is in place. The elastomeric material fills in the gaps created at the corners of the exterior hard shell to allow flex for mounting."

Therefore, this discloses the concept of having the soft inner membrane and the hard outer shell but again, it is only on one side of the cell phone protector case, not on both sides.

The '122 Richardson Patent discloses a cell phone protector case having a multiplicity of different layers of material.

The Fathollahi Design Patent does not discuss what the interior of the cell phone protector case is made of but in reviewing the figures, it is clear that there is an interior shell with a hard backing member but again, it is only on one side of the interior soft shell.

The Park Published Patent Application discloses:

"A protector for smartphones includes a cover located on the entire front face of a smartphone and constructed to have the same width as an LCD screen of the smartphone, the cover having through holes for exposing touch buttons and a speaker of the smartphone to the outside; and a main body made of a soft synthetic resin with flexibility, the main body having a space for accommodating the back of the smartphone, a retaining portion for fastening an outer edge of the cover located on the front face of the smartphone, and a through hole formed on a rear face thereof for exposing a camera of the smartphone to the outside."

The Mongan Patent has an inner elastomeric layer and the outer shell but again, it is to one side of the elastomeric layer.

The Yao Chinese Patent discloses a soft inner member surrounded by a hard backing member but only on one side.

The Zhu Chinese Patent discloses an anti-falling anti-slip hand casing. Reading from the abstract, the patent states:

"An anti-falling anti-slip hand easing, comprises a mobile phone shell, the mobile phone the surface of the shell is provided with an elastic material layer, the elastic material layer at the opening in the cell-phone shell is provided with openings; the mobile phone the back of the shell layer of resilient material is provided with a plurality of protruding point on. The utility model has the advantages of simple structure, the application of the elastic material layer and anti-falling of the anti-skid characteristics of the structure, of the existing simple improvement of the mobile phone, the utility model of the mobile phone shell is provided with anti-falling anti-skid characteristics."

There is a significant need for an improved cell phone protector case which has an interior protective silicone layer to protect the cell phone and grip the cell phone and a hard clam shell case to envelope both the front and back of the soft silicone case to provide added protection for the cell phone.

SUMMARY OF THE INVENTION

The present invention is a cell phone protector case comprising a combination of an interior soft silicone shell and a first and second had hard shell press fit retained on opposite surfaces and sides of the interior soft silicone shell with the hard shell having matching retaining closing member mating flanges.

The object of the present invention is to create a unique cell phone which contains the following combination unique features: (a) a combination of an interior soft silicone shell and a front hard exterior shell and a rear hard exterior shell press fit retained on opposite surfaces and sides of the interior soft silicone shell with the front and rear hard exterior shells having matching-retaining closing member mating flanges; (b) said interior soft silicone shell having openings in its front surface and in its rear surface to conform to specific models of cell phones, the interior soft silicone shell is configured to securely and firmly grip the cell phone to be sure that it is securely retained within the cell phone protector case, the interior soft silicone shell including an exterior upper rim with extended rounded sidewalls along and on opposite ends of its upper rim and a comparable extended lower rim with extended rounded sidewalls along and on opposite ends of its lower rim to provide extra cushioning for the cell phone, the sidewalls of the interior soft silicone shell further contain flared silicone cushioning extensions which are interspersed between aligned exterior shell mating members to provide extra cushioning and protection for the cell phone, the cushioning extensions are aligned between aligned retaining members on two sections of the hard exterior shell press fit retained on opposite surfaces of the interior soft silicone shell; (c) the interior soft silicone shell having the upper rim, lower rim, parallel sidewalls, a rear surface and a front surface which surround an interior chamber with an open face in the front surface through which the cell phone and its operating buttons are visible and touchable; (d) a front hard exterior shell and a rear hard exterior shell which are designed to be press fit retained by the interior soft silicone shell by having matching mating members on sidewalls of the front and rear hard exterior shells to envelope the interior soft silicone shell to fit within the front surface and the rear surface as well as on the sidewalls; (e) the front hard exterior shell component is configured to be press fit retained to the front of the interior soft silicone shell so that a front surface of the interior soft silicone shell includes a flat upper surface which extends below the rim and has an interior ledge which abuts against the top rim of the interior soft silicone shell, the front hard exterior shell having an upper surface and an upper rim which are designed to conform in shape to the front surface of the interior soft silicone shell and abut against the ledge to form a press fit so that the front hard exterior shell is aligned with the interior silicone surface, similarly, the lower rim of the interior soft silicone shell having a lower interior surface and ledge which abuts against the lower rim of the interior soft silicone shell, the bottom of the front hard exterior shell including a bottom surface and a bottom rim which abut against the interior ledge of the interior soft silicone shell of the lower rim so that the lower surface fits within the lower surface of the silicone shell, the interior soft silicone shell also includes a button and the lower wall of the first exterior hard shell contains an opening which fits around the button to further securely retain the front hard exterior outer shell to the interior soft silicone shell; (f) the first sidewall of the front hard exterior shell includes mating flanges which are designed to fit within recesses of the sidewall of the interior soft silicone shell, the opposite sidewall of the front hard exterior shell including extending flanges designed to fit within the respective recesses of the interior soft silicone shell so that there is a press fit with recesses designed to receive cushioning protrusions from the interior soft silicone shell, the front hard exterior shell is designed to be press fit received onto the front and sidewalls of the interior soft silicone case; (g) the rear surface of the interior soft silicone shell having a recessed surface extending from the interior of the upper rim to the interior of the lower rim and a recessed ledge adjacent the interior of the upper rim and a recessed ledge adjacent the interior of the lower rim, the rear surface of the interior soft silicone shell is recessed to accommodate the rear hard exterior protective shell, the interior soft silicone shell having protrusions also extending from the second sidewall onto the rear surface of the interior soft silicone shell; (h) the rear of the hard exterior shell having openings to accommodate respective openings in the interior soft silicone interior shell, the rear hard exterior shell also having an upper rim and rounded ends designed to respectively fit against the upper rim and upper rounded ends of the interior soft silicone shell and a lower rim and rounded ends designed to respectively fit against the lower edge and the interior rim and lower rounded ends of the interior soft silicone shell, the rear hard exterior shell also including sidewalls with mating flanges designed to fit recesses on the wall of the interior soft silicone shell and rear recesses designed to receive cushioning protruding members from the interior soft silicone shell; (i) the rear hard exterior shell section has a tight press fit against the rear of the interior soft silicone shell and mating flanges from the two respective front exterior hard shell and rear exterior hard shell outer sections are aligned on the sidewalls of the inner soft silicone shell, the mating flanges from the front hard exterior shell and rear hard exterior shell sections are aligned with each other on the sidewalls of interior soft silicone shell and the protruding cushioning members further assist in the press fit retention; and (j) when the front hard exterior shell and rear hard exterior shell two outer hard shell sections are press fit retained within their respective positions within the interior soft silicone shell, they form a hard outer shell to complement the interior soft inner interior silicone shell, which front and rear hard exterior outer shells are press fit retained onto and within the interior soft silicone shell and which hard front and rear hard exterior shells provide further protection to the cell phone protector case so that it can be easily slipped into and out of a pocket and also cushion a blow should the cell phone be dropped.

It is an object of the present invention to create a unique cell phone protector case which contains the following components: (a) a combination of an interior soft shell and a front hard exterior shell and a rear hard exterior shell press fit retained on opposite surfaces and sides of the interior soft shell with the front and rear hard exterior shells having matching aligned closing member mating flanges; (b) said interior soft shell having openings on at least one surface to conform to specific models of cell phones, the interior soft shell is configured to securely and firmly grip the cell phone, the interior soft shell including a recessed front surface and a recessed rear surface, the interior soft shell including an exterior upper rim with extended rounded sidewalls along and on opposite ends of its upper rim and a comparable extended lower rim with extended rounded sidewalls along and on opposite ends of its lower rim, a recessed front surface and a recessed rear surface resting below the upper and lower rim and their respective rounded ends, the sidewalls of the interior soft shell further contain cushioning extensions which are interspersed between aligned outer front and rear hard shell mating retaining members, the first and second sidewalls of the interior soft shell further include longitudinal gaps between the cushioning extensions; (c) the interior soft shell including the upper rim, the lower rim, and first and second sidewalls which are parallel to each other surround an interior chamber with an open face through which the cell phone is visible; and (d) the front exterior hard shell which is designed to be press fit retained by the interior soft shell by having matching mating flanges on the sidewalls of the front exterior hard shell, a front of the front exterior hard shell configured to rest on the recessed front surface and against the upper and lower rim and their respective rounded ends, and the rear of the exterior hard shell configured to rest on the recessed rear surface of the interior soft shell and against the upper and lower rims and their respective rounded ends, and the rear of the hard shell and having mating members on its sidewalls which match the mating flanges on the sidewalls of the front exterior hard shell.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
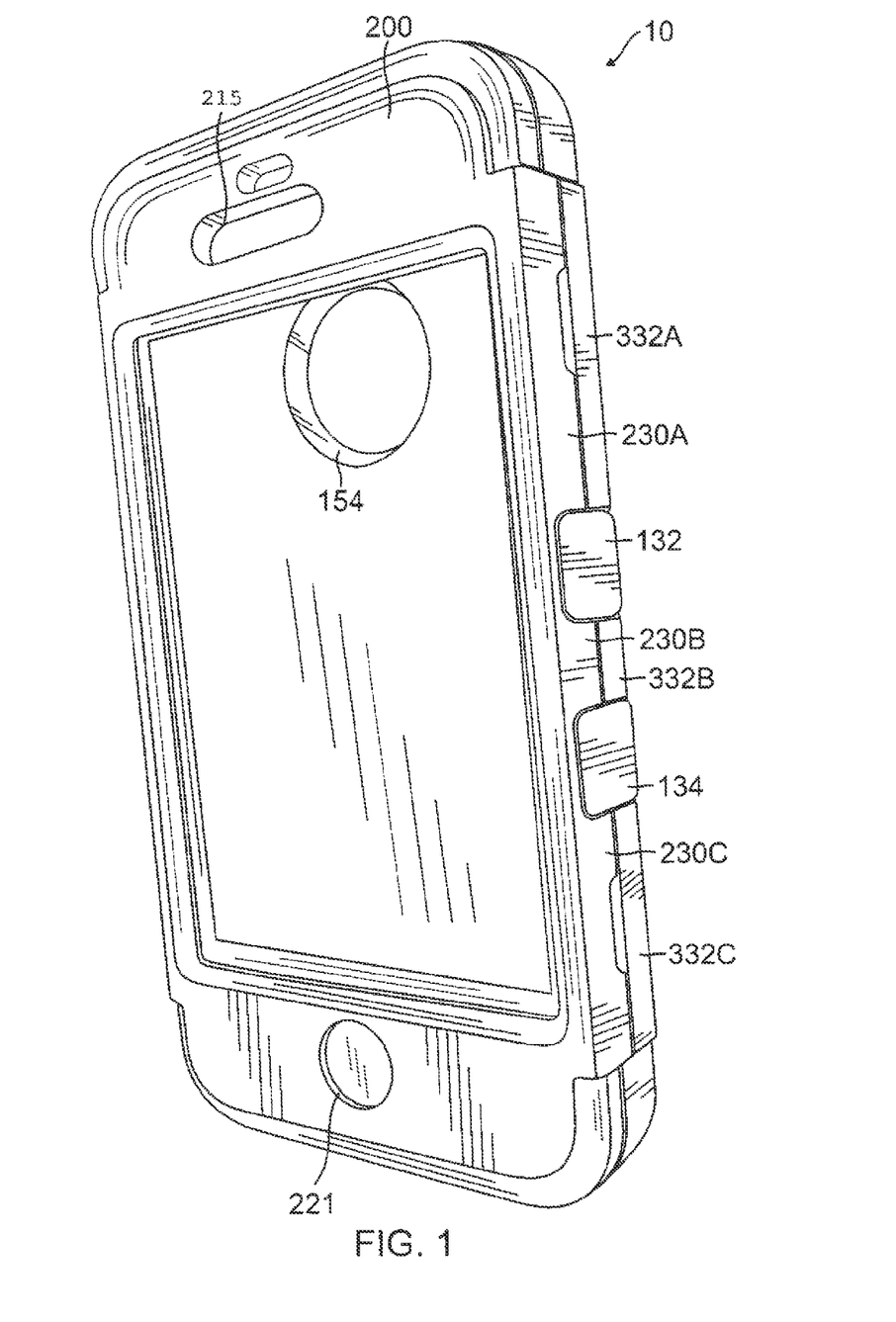
FIG. 1 is a front perspective view of the present invention.
Figure 2:
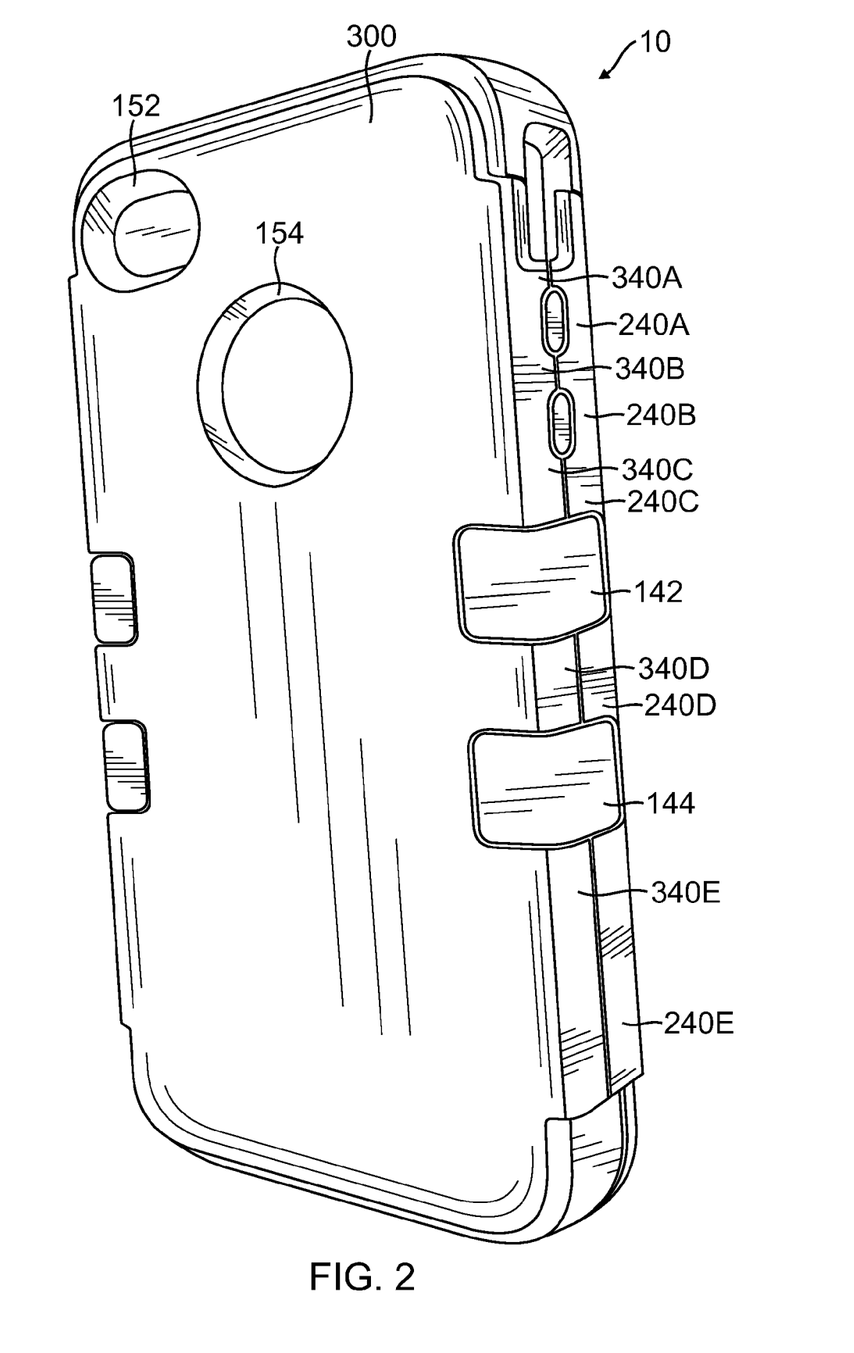
FIG. 2 is a rear perspective view thereof.
Figure 3:
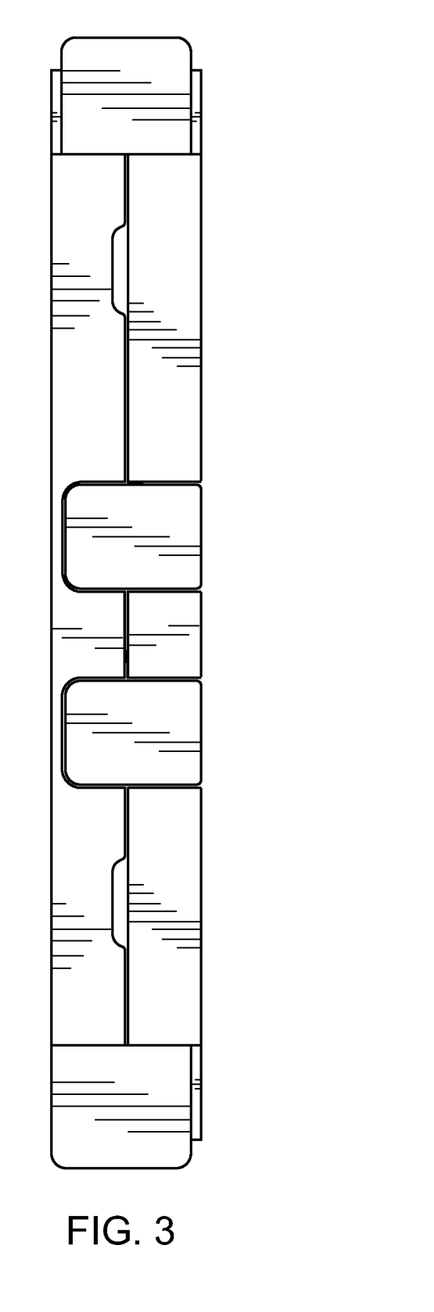
FIG. 3 is a side elevational view thereof when viewed from the left side.
Figure 4:
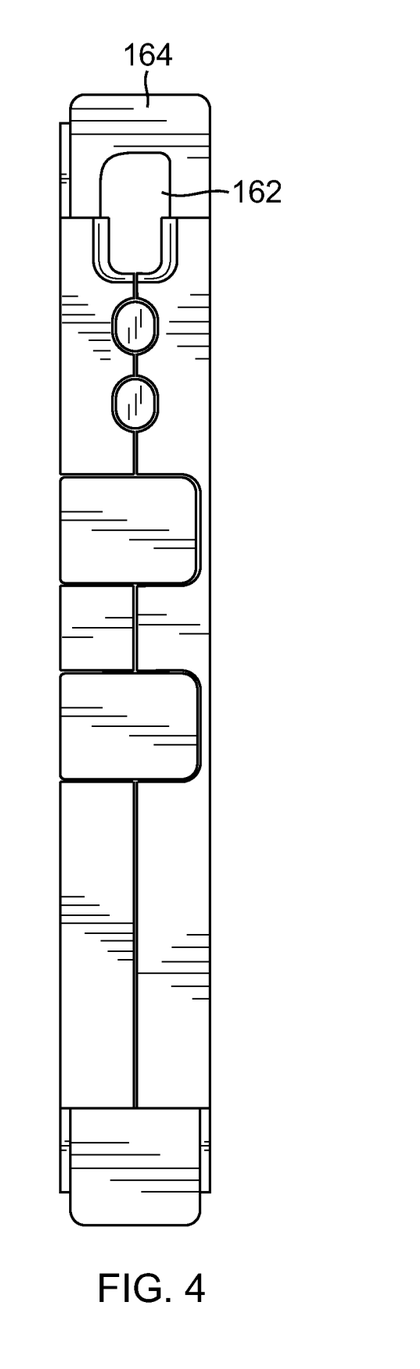
FIG. 4 is a side elevational view thereof when viewed from the right side.

Referring to FIGS. 1-8, the present invention cell phone protector case having the combination of an interior soft shell made out of material selected from the group consisting of silicone and soft rubber and a hard outer shell exterior shell made out of material selected from the group consisting of hard plastic and metal is illustrated in its assembled form without the cell phone contained therein in FIGS. 1 and 2.

The present invention consists of three primary components. The first significant component is an interior soft shell preferably made of silicone which is numbered 100 and has openings on the front and rear to conform to specific models of cell phone protector cases. The particular design that is shown in this patent is designed to conform to the iPhone 4S/4.

Referring particularly to FIGS. 5 through 8, the interior soft silicone shell is designed to securely and firmly grip the cell phone to be sure that it is securely retained within the cell phone protector case. The key features of the interior silicone membrane include an exterior upper rim 110 with extended rounded sidewalls 112 and 114 along and on opposite ends of its upper rim 110 and a comparable extended lower rim silicone section 120 with extended rounded sidewalls 122 and 124 along and on opposite ends of its lower rim 120 to provide extra cushioning for the cell phone. In addition to that, the sidewalls contain flared silicone extensions which are interspersed between the outer shell mating members to provide extra cushioning and protection for the cell phone. These cushioning members are aligned between aligned retaining members on the two sections of the outer hard shell on opposite surfaces of the inner soft silicone shell.

Figure 5:
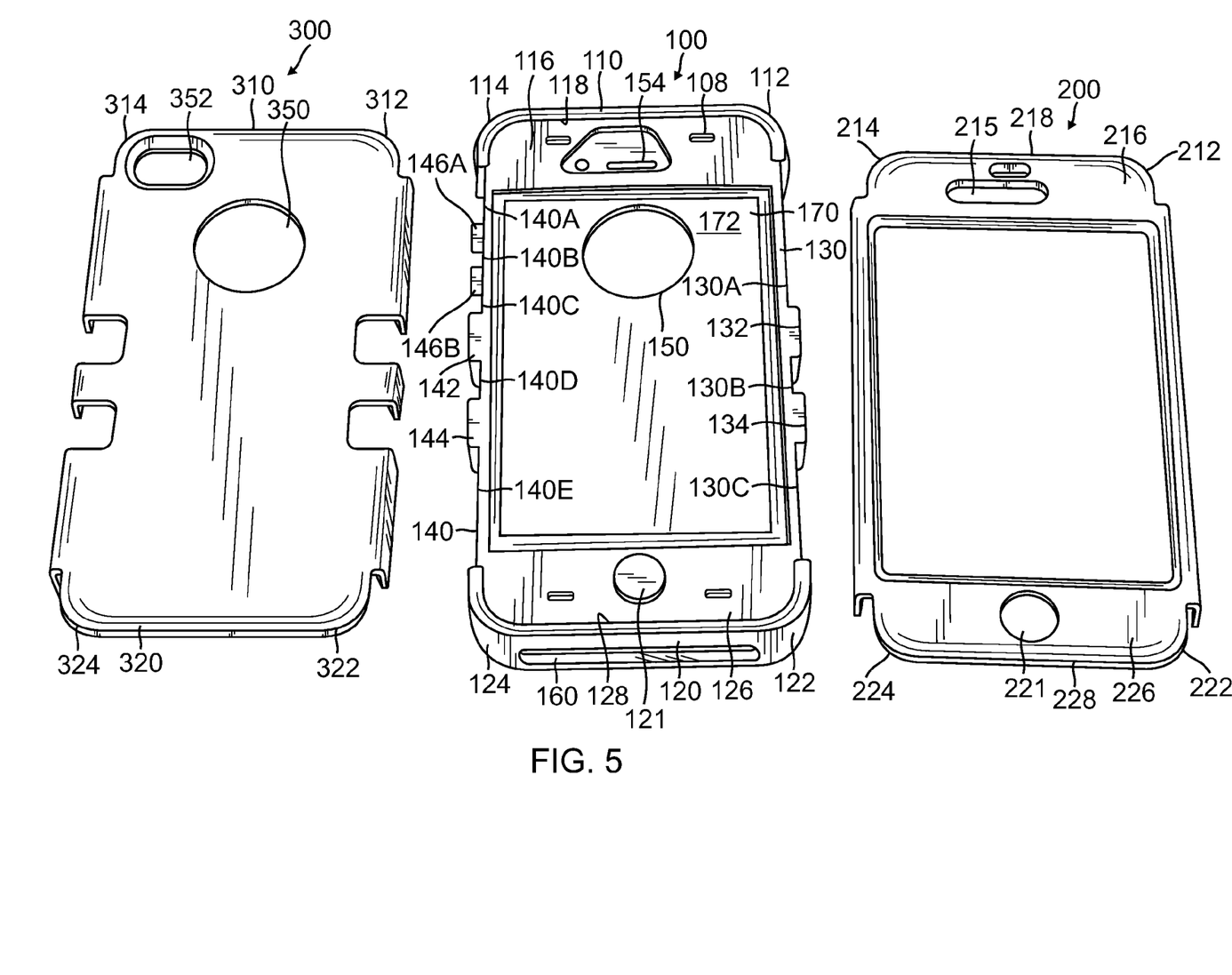
FIG. 5 is a front perspective view thereof with the components separated.
Figure 6:
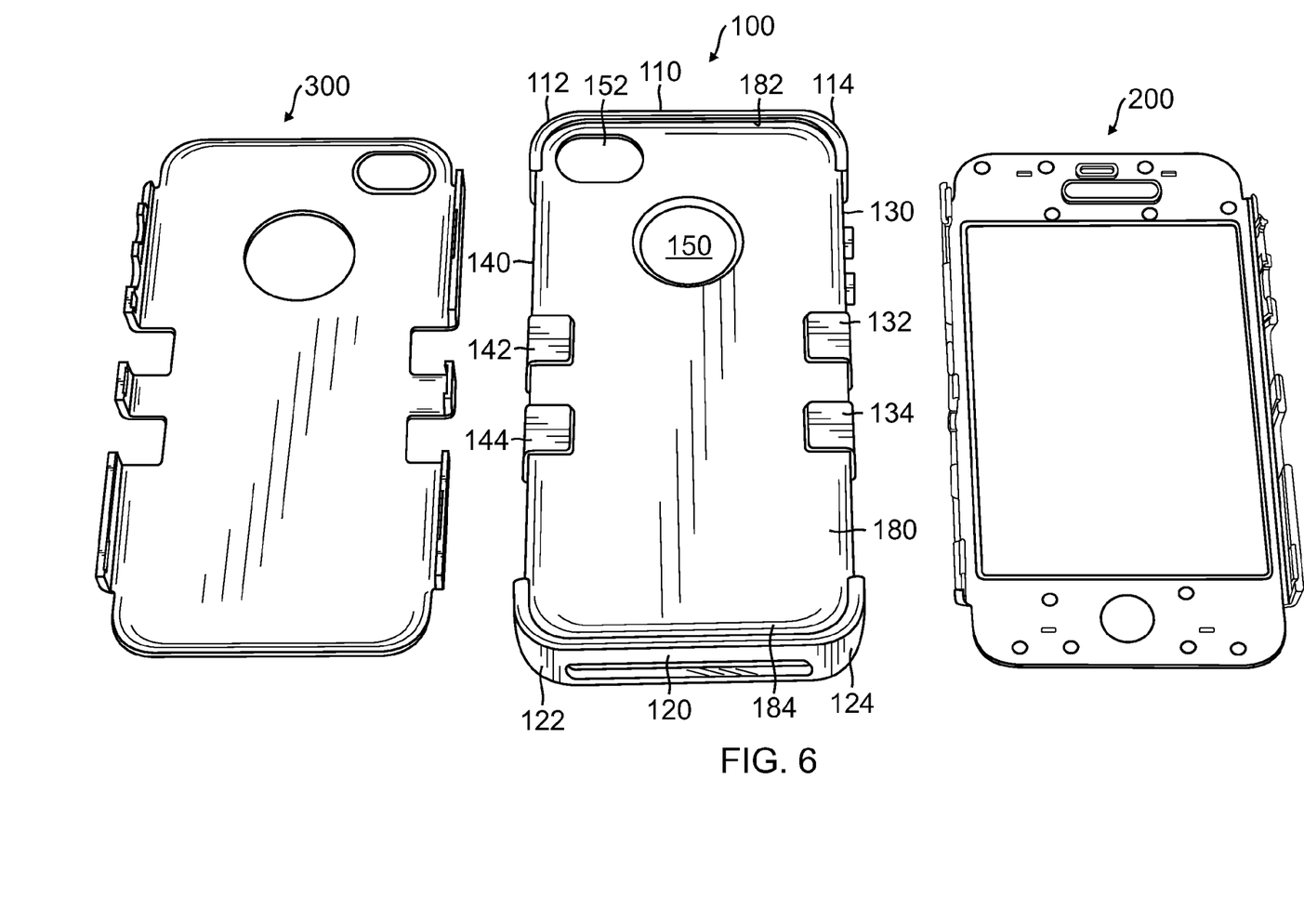
FIG. 6 is a rear perspective view thereof with the components separated.

Specifically, referring to FIGS. 5 and 6, first sidewall 130 has extended cushioning sections 132 and 134 and second sidewall 140 has extended cushioning sections 142 and 144. The sidewalls 130 and 140 and extended cushioning sections 132, 134, 142 and 144 are also illustrated in the exploded side views of FIGS. 7 and 8. In addition, the interior silicone shell contains openings to accommodate specific designs of a cell phone. For example, referring to FIGS. 5 and 6, the rear of the silicone shell contains openings 150 for a camera and 152 for a flash and on the front surface contains openings 154 for a microphone. The lower rim 120 contains an opening 160 for a charge. In addition, in order to accommodate a two-part exterior hard surface outer shell, the interior silicone wall contains interior longitudinal gaps between extending members, the gaps including interior sidewall portions 130A, 130B and 130C between cushioning members 132 and 134 and on the opposite side 140 cushioning protrusions 146A and 146B as well as interior wall sections 140A, 140B, 140D and 140E. The interior shell also contains openings such as 160 to accommodate a charger unit and opening 162 for a control button and opening 164 (shown in dotted lines) for a head phone jack. It will be appreciated that the various openings will be modified to accommodate the specific brand of cell phone and that the specific brand that this particular silicone shell is conformed to is for the iPhone 4S/4.

The cushioned walls 110, 120, 130 and 140 surround an interior chamber 170 with an open face 172 through which the cell phone and its operating buttons are visible and touchable. As a result of the soft silicone case completely surrounding a cell phone 500 illustrated in FIG. 9, the cell phone is fully protected and cushioned so that if it is dropped, it will be secure and not be damaged.

The second component of the present invention is the exterior hard shell which is designed to be press fit retained by the soft silicone interior with having matching mating members on its sidewalls to envelope the interior soft silicone case to fit within the front and the back as well as on the sidewalls. Referring to FIGS. 1-8, the front shell component is illustrated at 200. The front shell component 200 is designed to be press fit retained to the front of the interior silicone case 100 in the following manner. The upper wall of the silicone membrane section 100 contains a recessed ledge 116 which extends below the rim 110 and has an interior portion 118 which abuts against the exterior top rim 110. The exterior shell 200 has an upper surface 216 and an upper rim 218 which are designed to conform in shape to the recessed ledge 116 and abut against the interior portion 18 to form a press fit so that the upper hard shell is aligned with the interior silicone surface. Similarly, the lower rim of the silicone shell 120 contains a lower recessed ledge 126 which extends below the rim 120 and has an interior portion 128 which abuts against the lower rim 120. The bottom of the hard cell phone protector case contains a bottom surface 226 and a bottom rim 228 which are designed to conform in shape to the recessed ledge 126 and abuts against the interior portion 128 of the soft silicone case so that the lower surface 226 fits within the lower surface 126 of the silicone frame. The silicone frame also contains a button 121 and the lower wall 226 of the first hard shell section and contains an opening 221 which fits around the button to further securely retain the front outer shell to the interior silicone rim.

There is also an opening 215 to receive the microphone and is aligned with opening 154 in the silicone soft shell 100.

Figure 7:
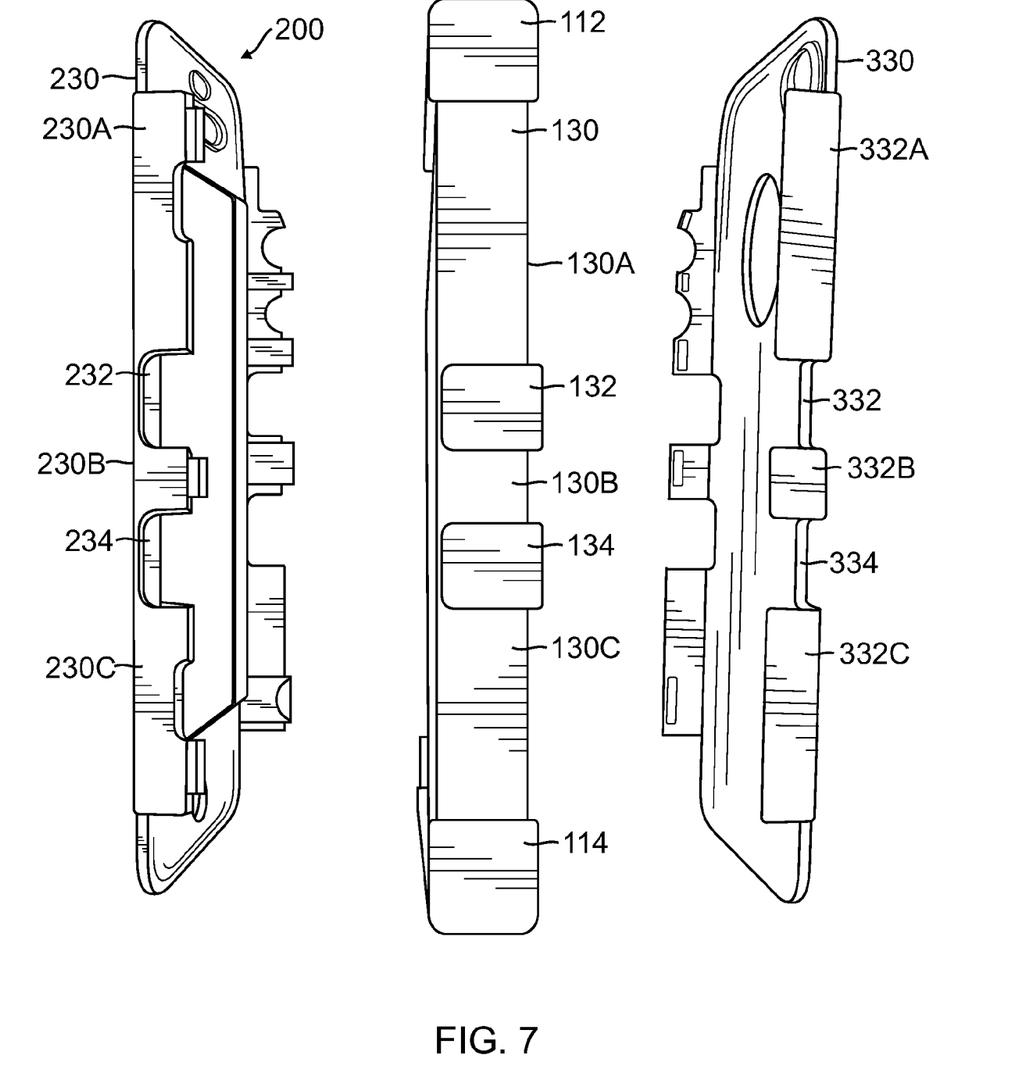
FIG. 7 is an exploded side view thereof when viewed from the right side with the components separated.
Figure 8:
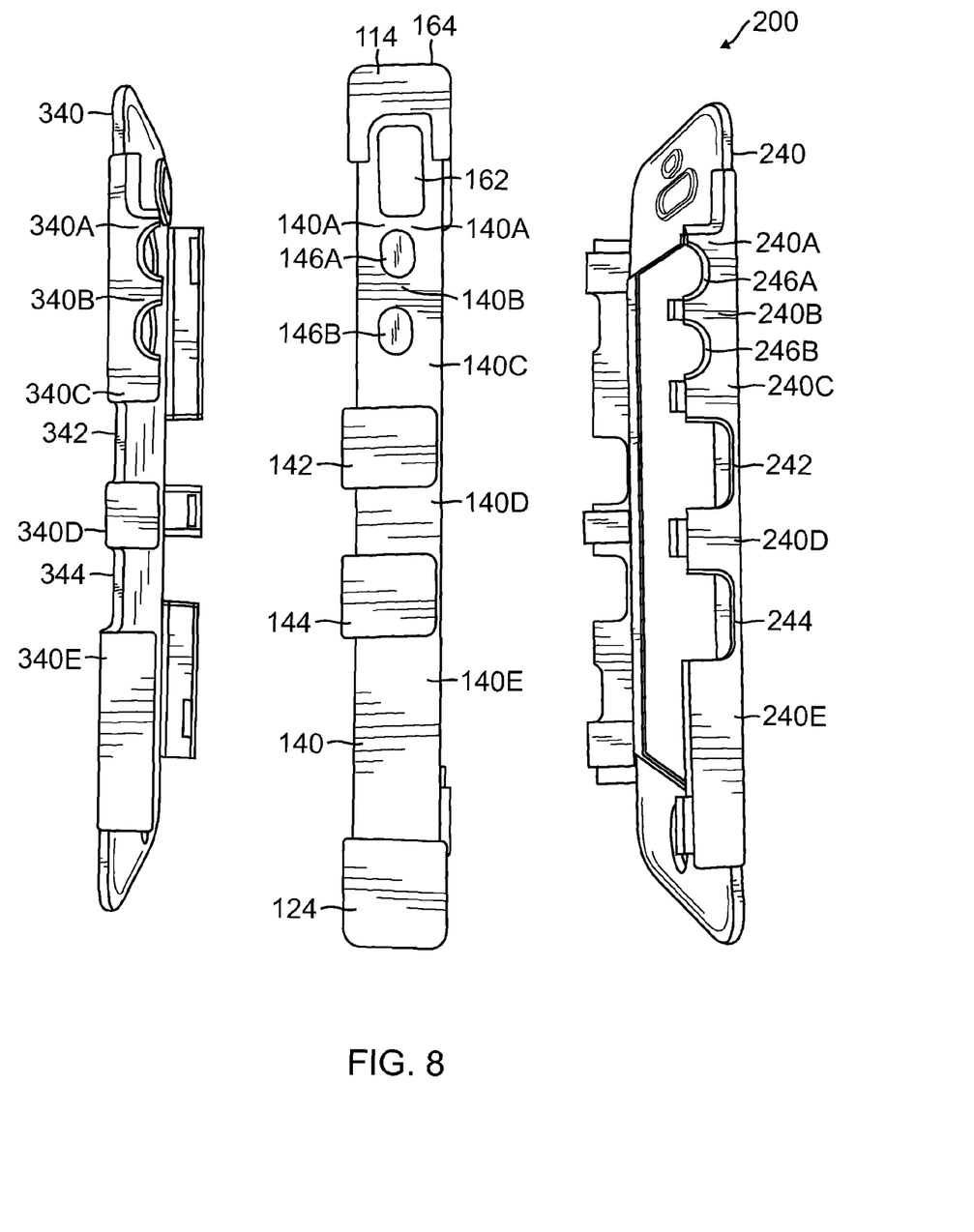
FIG. 8 is an exploded side view thereof when viewed from the left side with the components separated.

Referring to the first sidewall of the upper exterior frame section best illustrated in FIG. 7, the sidewall 230 contains mating flanges 230A, 23013 and 230C which are designed to fit within recesses 130A, 130B and 130C of the sidewall of the silicone shell member or case 100. Similarly, referring to FIG. 8, the opposite sidewall 240 of the front section 200 contains extending flanges 240A, 240B, 240C, 240D and 240E designed to fit within the respective recesses 140A, 140B, 140C and 140D of the interior silicone shell so that there is a press fit with recesses 246A, 246B designed to receive protrusions 146A and 146B from the silicone shell and interior recesses 242 and 244 respectively designed to receive extensions 142 and 144 from the interior silicone case.

Therefore, it is clear that the outer exterior shell 200 is designed to be press fit onto the front 108 and sidewall 140 of the protective silicone case or shell 100.

As best illustrated in FIG. 6, with respect to the rear protective shell 300, the interior silicone case or shell 100 has a recessed surface 180 which forms a portion 182 adjacent the rear of upper rim 110 and a recessed portion 184 adjacent the interior of lower rim 120. The surface 180 is recessed to accommodate the rear protective shell 300. The cushioning protrusions 132, 134, 142 and 144 also extend from the sidewall onto the rear surface as illustrated in FIG. 6.

Referring to FIG. 5, the rear of the hard shell protector case 300 has openings 352 and 350 to accommodate the respective openings 152 and 150 in the silicone interior shell of case 100. The protector case also has an upper rim 310 and rounded ends 312 and 314 designed to fit against portion 118 and the interior of rounded ends 112 and 114 and having a lower rim 320 and rounded corners 322 and 324 designed to respectively fit against portion 128 and the interior of rounded ends 122 and 124.

Referring to FIG. 5, the front 200 of the hard shell protector case has openings 215 to accommodate the opening 154 in the silicone interior shell or case 100. The front had shell also has an upper rim 218 and rounded ends 212 and 214 designed to fit against portion 218 and the interior of rounded ends 112 and 114 and having a lower rim 228 and rounded corners 222 and 224 designed to respectively fit against portion 128 and the interior of rounded ends 122 and 124.

Referring to FIG. 7, sidewall 330 has mating flange 332A designed to fit recess 130A, mating flange 332B designed to fit recess 130B and mating flange 332C designed to fit recess 130C in the silicone shell or case 100 and has recess 332 designed to receive extending cushioning member 132 from the inner silicone shell 100 and recess 334 designed to receive extending cushioning member 134. Similarly, referring to FIG. 8, sidewall 340 has mating flanges 340A, 340B and 340C designed to be received in recesses 140A, 140B and 140C in the interior membrane shell 100. Referring to FIG. 7, protrusion 330A is designed to fit recess 130, protrusion 230B is design to fit recess 130B and protrusion 232C designed to fit recess 130C in the silicone membrane and has recess 230 designed to receive extending member 130 in the membrane and recess 234 designed to receive extending member 134. Similarly referring to FIG. 8, sidewall 340 has protrusions 340A, 340B and 340C designed to be received in recesses 140A, 140B and 140C in the membrane shell 100; mating flange 340D deigned to be received onto recess 140D and mating flange 340E designed to be received onto recess 140E and which wall in turn has recess 342 designed to receive cushioning protruding member 142 from the interior membrane shell 100 and recess 344 designed to receive cushioning protruding member 344 from the interior membrane shell 100.

Therefore, the rear shell section 300 has a tight press fit against the rear of the soft silicone case. Mating flanges from the two respective hard shell outer sections are aligned on the sidewall of the inner silicone shell 100. The mating flanges from sections 200 and 300 are aligned with each other on the sidewall of interior member 100. As illustrated in FIG. 1, the following mating flanges are aligned with each other; 230A and 332A, 230B and 3332B, and 230C and 332C, 240A and 340A, 240B and 340B, 240C and 340C, 240D and 340D, and 240E and 340E.

When the two outer hard shell sections 200 and 300 are press fit retained within their respective positions within the silicone case as illustrated in FIGS. 1 and 2, they form a hard outer shell to complement the soft inner shell 100, which hard outer shell is press fit retained onto and within the soft silicone inner shell 100 and which hard outer shell provides further protection to the cell phone protector case 10 so that it can be easily slipped into and out of a pocket and also cushion a blow should the cell phone be dropped.

Figure 9:
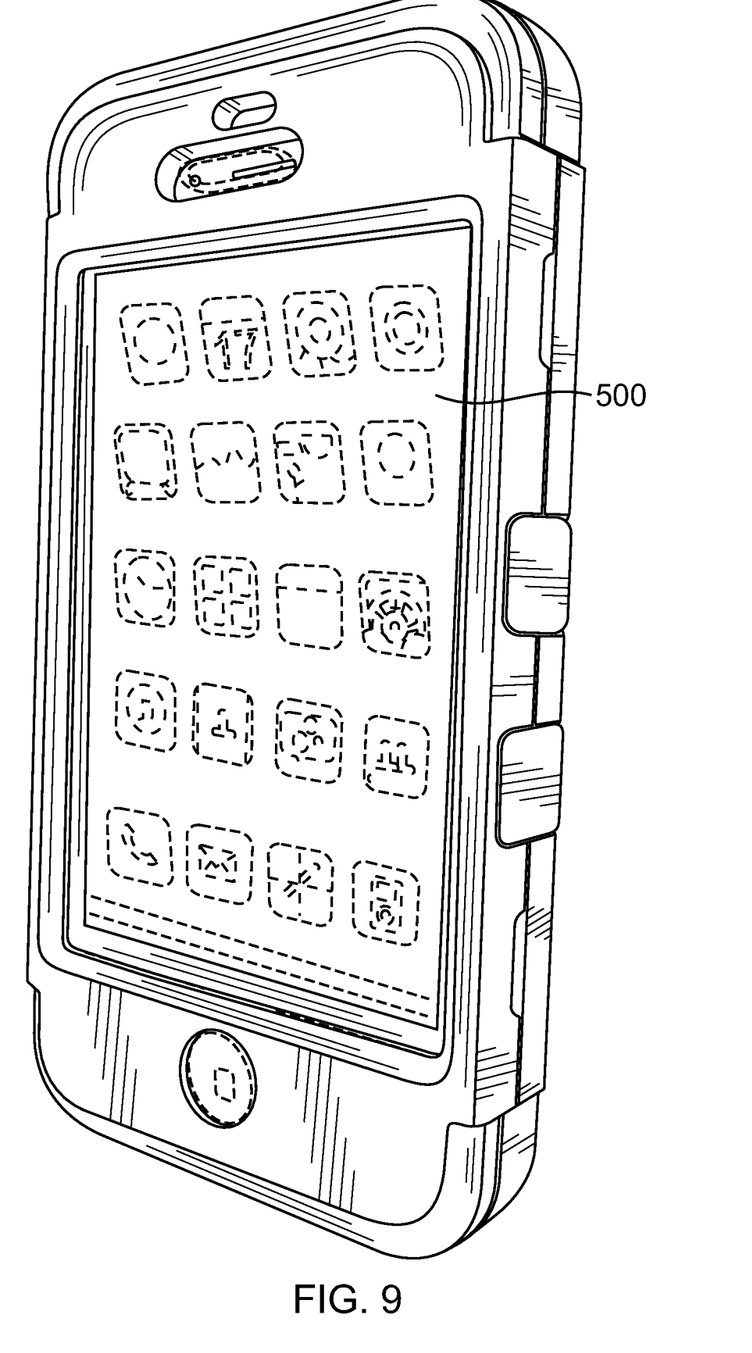
FIG. 9 is a front perspective view thereof with the enclosed protective case enclosing a cell phone with the screen visible.

As illustrated in FIG. 9, the cell phone itself is securely retained within the soft silicone case to protect the cell phone from any damage.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A cell phone protector case to retain a cell phone, comprising:

a. a combination of an interior soft silicone shell and a front hard exterior shell and a rear hard exterior shell press fit retained on opposite surfaces and sides of the interior soft silicone shell with the front and rear hard exterior shells having matching closing member mating flanges;

b. said interior soft silicone shell having openings in its front surface and in its rear surface to conform to specific models of cell phones, the interior soft silicone shell is configured to securely and firmly grip the cell phone to be sure that it is securely retained within the cell phone protector case, the interior soft silicone shell including an exterior upper rim with extended rounded sidewalls along and on opposite ends of its upper rim and a comparable extended lower rim with extended rounded sidewalls along and on opposite ends of its lower rim to provide extra cushioning for the cell phone, the sidewalls of the interior soft silicone shell further contain flared silicone cushioning extensions which are interspersed between aligned exterior shell mating members to provide extra cushioning and protection for the cell phone, the cushioning extensions are aligned between aligned retaining members on two sections of the hard exterior shell press fit retained on opposite surfaces of the interior soft silicone shell;

c. the interior soft silicone shell having the upper rim, lower rim, parallel sidewalls, a rear surface and a front surface which surround an interior chamber with an open face in the front surface through which the cell phone and its operating buttons are visible and touchable;

d. the front hard exterior shell and the rear hard exterior shell which are designed to be press fit retained by the interior soft silicone shell by having matching mating members on sidewalls of the front and rear hard exterior shells to envelope the interior soft silicone shell to fit within the front surface and the rear surface as well as on the sidewalls;

e. the front hard exterior shell component is configured to be press fit retained to the front of the interior soft silicone shell so that a front surface of the interior soft silicone shell includes a flat upper surface which extends below the rim and has an interior ledge which abuts against the top rim of the interior soft silicone shell, the front hard exterior shell having an upper surface and an upper rim which are designed to conform in shape to the front surface of the interior soft silicone shell and abut against the ledge to form a press fit so that the front hard exterior shell is aligned with the interior silicone surface, similarly, the lower rim of the interior soft silicone shell having a lower interior surface and ledge which abuts against the lower rim of the interior soft silicone shell, the bottom of the front hard exterior shell including a bottom surface and a bottom rim which abut against the interior ledge of the interior soft silicone shell of the lower rim so that the lower surface fits within the lower surface of the silicone shell, the interior soft silicone shell also includes a button and the lower wall of the front exterior hard shell contains an opening which fits around the button to further securely retain the front hard exterior outer shell to the interior soft silicone shell;

f. the first sidewall of the front hard exterior shell includes mating flanges which are designed to fit within recesses of the sidewall of the interior soft silicone shell, the opposite sidewall of the front hard exterior shell including extending flanges designed to fit within the respective recesses of the interior soft silicone shell so that there is a press fit with recesses designed to receive cushioning protrusions from the interior soft silicone shell, the front hard exterior shell is designed to be press fit received onto the front and sidewalls of the interior soft silicone case;

g. the rear surface of the interior soft silicone shell having a recessed surface extending from the interior of the upper rim to the interior of the lower rim and a recessed ledge adjacent the interior of the upper rim and a recessed ledge adjacent the interior of the lower rim, the rear surface of the interior soft silicone shell is recessed to accommodate the rear hard exterior protective shell, the interior soft silicone shell having protrusions also extending from the second sidewall onto the rear surface of the interior soft silicone shell;

h. the rear of the hard exterior shell having openings to accommodate respective openings in the interior soft silicone interior shell, the rear hard exterior shell also having an upper rim and rounded ends designed to respectively fit against the upper rim and upper rounded ends of the interior soft silicone shell and a lower rim and rounded ends designed to respectively fit against the lower edge and the interior rim and lower rounded ends of the interior soft silicone shell, the rear hard exterior shell also including sidewalls with mating flanges designed to fit recesses on the wall of the interior soft silicone shell and rear recesses designed to receive cushioning protruding members from the interior soft silicone shell;

i. the rear hard exterior shell section has a tight press fit against the rear of the interior soft silicone shell and mating flanges from the two respective front exterior hard shell and rear exterior hard shell outer sections are aligned on the sidewalls of the inner soft silicone shell, the mating flanges from the front hard exterior shell and rear hard exterior shell sections are aligned with each other on the sidewalls of interior soft silicone shell and the protruding cushioning members further assist in the press fit retention; and j. when the front hard exterior shell and rear hard exterior shell two outer hard shell sections are press fit retained within their respective positions within the interior soft silicone shell, they form a hard outer shell to complement the interior soft inner interior silicone shell, which the front and rear hard exterior outer shells are press fit retained onto and within the interior soft silicone shell and which hard front and rear hard exterior shells provide further protection to the cell phone protector case so that it can be easily slipped into and out of a pocket and also cushion a blow should the cell phone be dropped.

2. The cell phone protector case in accordance with claim 1, further comprising the front and rear hard exterior shells are made out of material selected from the group consisting of hard plastic and metal.

3. A cell phone protector case to retain a cell phone, comprising:

a. a combination of an interior soft shell and a front hard exterior shell and a rear hard exterior shell press fit retained on opposite surfaces and sides of the interior soft shell with the front and rear hard exterior shells having matching aligned closing member mating flanges;

b. said interior soft shell having openings on at least one surface to conform to specific models of cell phones, the interior soft shell is configured to securely and firmly grip the cell phone, the interior soft shell including a recessed front surface and a recessed rear surface, the interior soft shell including an exterior upper rim with extended rounded sidewalls along and on opposite ends of its upper rim and a comparable extended lower rim with extended rounded sidewalls along and on opposite ends of its lower rim, a recessed front surface and a recessed rear surface resting below the upper and lower rim and their respective rounded ends, the sidewalls of the interior soft shell further contain cushioning extensions which are interspersed between aligned outer front and rear hard shell mating retaining members, the first and second sidewalls of the interior soft shell further include longitudinal gaps between the cushioning extensions;

c. the interior soft shell including the upper rim, the lower rim, and first and second sidewalls which are parallel to each other surround an interior chamber with an open face through which the cell phone is visible; and d. the front exterior hard shell which is designed to be press fit retained by the interior soft shell by having matching mating flanges on the sidewalls of the front exterior hard shell, a front of the front exterior hard shell configured to rest on the recessed front surface and against the upper and lower rim and their respective rounded ends, and the rear of the exterior hard shell configured to rest on the recessed rear surface of the interior soft shell and against the upper and lower rims and their respective rounded ends, and the rear of the hard shell and having mating members on its sidewalls which match the mating flanges on the sidewalls of the front exterior hard shell.

4. The cell phone protector case in accordance with claim 3, further comprising:

a. the front hard exterior shell component is configured to be press fit retained to the front of the interior soft shell so that an upper surface of the interior soft shell includes a flat upper surface which extends below the rim and has an interior ledge which abuts against the exterior top rim of the interior soft shell, the front exterior hard shell having an upper surface and an upper rim which are designed to conform in shape to the interior upper surface and fit over the ledge to form a press fit so that the upper exterior hard shell is aligned with the interior soft shell surface, similarly, the lower rim of the soft shell having a lower interior surface and ledge which abuts against the lower rim of the interior soft shell, a rear interior bottom of the rear exterior hard shell phone protector case including a bottom surface and a bottom rim which fits over the interior ledge of the rear of the soft shell so that the rear interior hard lower surface of the exterior shell fits within the lower surface of the interior soft shell.

5. The cell phone protector case in accordance with claim 4, further comprising: the front surface of the soft shell also includes a button and the lower wall of the front exterior hard shell contains an opening which fits around the button to further securely retain the front exterior hard outer shell to the interior silicone rim.

6. The cell phone protector case in accordance with claim 3, further comprising: the first sidewall of the front exterior hard shell includes mating flanges which are designed to fit within recesses of the sidewall of the soft shell, the opposite sidewall of the front exterior hard shell section including extending flanges designed to fit within the respective recesses of the interior soft shell so that there is a press fit with recesses designed to receive cushioning protrusions from the soft shell, the front exterior hard shell is designed to be press fit received onto the front and sidewalls of the interior silicone case shell.

7. The cell phone protector case in accordance with claim 3, further comprising: the front exterior hard shell having at least one opening to accommodate the at least one opening in the interior soft shell.

8. The cell phone protector case in accordance with claim 3, comprising:

a. the front and rear exterior hard shell have a tight press fit respectively against the front surface and rear surface of the interior soft shell and mating flanges from the respective front and rear exterior hard shells are aligned on the sidewalls of the interior soft shell, the mating flanges from the front and rear exterior hard shell shells are aligned with each other on the sidewalls of interior soft shell and the protruding cushioning members further assist in the press fit retention; and b. when the front and rear hard shells are press fit retained within their respective positions within the interior soft shell, they form a hard outer shell to complement the interior soft shell, which hard outer shell is press fit retained onto and within the soft silicone interior shell and which hard outer shell provides further protection to the cell phone protector case so that it can be easily slipped into and out of a pocket and also cushion a blow should the cell phone be dropped.

9. The cell phone protector case in accordance with claim 3, further comprising: the soft shell is made of material selected from the group consisting of silicone and rubber.

10. The cell phone protector case in accordance with claim 3, further comprising: the front and rear hard exterior hard shells are each made out of material selected from the group consisting of hard plastic and metal.

11. The cell phone protector case in accordance with claim 3, further comprising:

a. the rear exterior hard shell is configured to be press fit retained to the rear of the interior soft shell so that a lower surface of the interior soft shell includes a flat upper surface which extends below the rim and has an interior ledge which abuts against the top rim of the interior soft shell, the rear exterior hard shell having an upper surface and an upper rim which are designed to conform in shape to the interior upper rim and fit over the interior ledge to form a press fit so that the exterior rear hard shell is aligned with the interior soft shell surface, similarly, the lower rim of the soft shell having a lower interior surface and ledge which abuts against the lower rim of the interior soft shell, the bottom of the rear exterior hard shell including a bottom surface and a bottom rim which fits over the interior ledge of the soft shell so that the lower surface of the rear exterior hard shell fits within the lower surface of the soft shell.

* * * * *